United States Patent Office 3,144,229
Patented Aug. 11, 1964

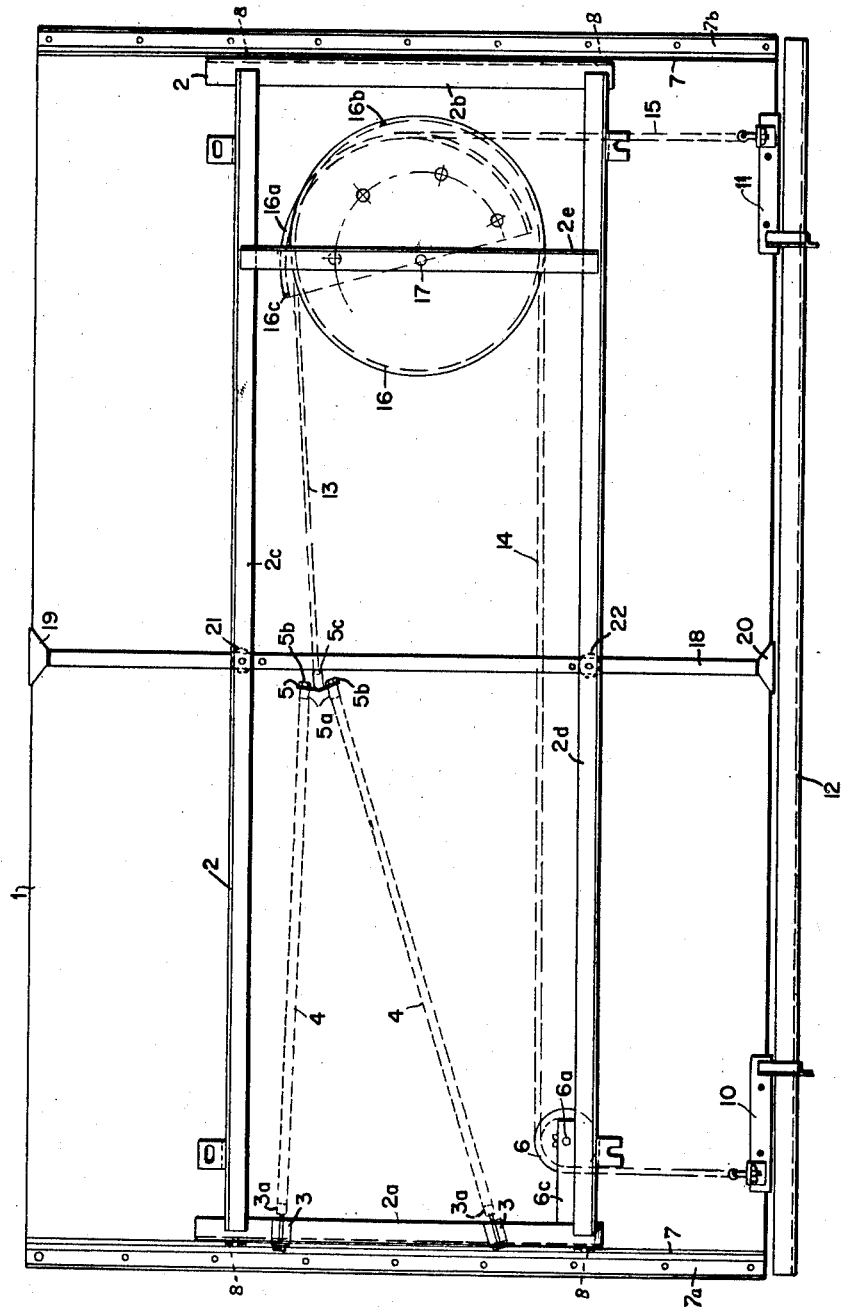

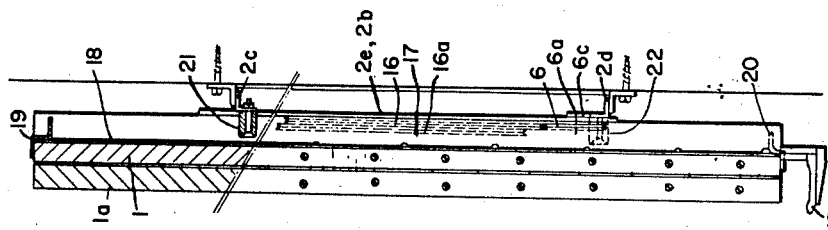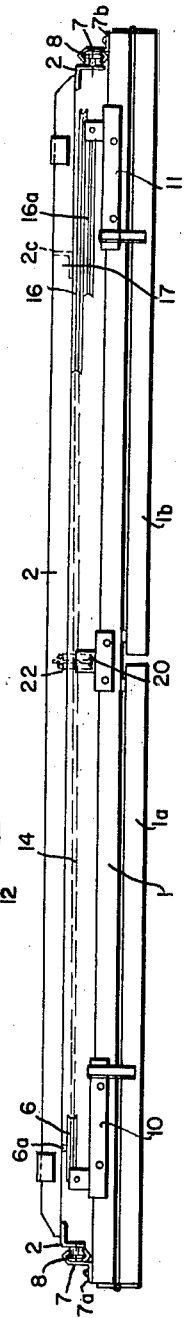

3,144,229
SUPPORTING CONSTRUCTIONS FOR A BLACKBOARD, PROJECTION SCREEN OR LIKE ARTICLE
Hendrik Wolters, Rapenburgerstraat 38–42, Amsterdam, Netherlands
Filed May 28, 1962, Ser. No. 198,009
3 Claims. (Cl. 248—31)

The invention relates to a supporting construction for balancing a blackboard, projection screen, notice board or other article of the same kind which can be shifted up and down. The supporting construction can be secured to a wall or to a displaceable trestle.

The requirements to be fulfilled by such a supporting construction are that the board is balanced in every position and that with the aid of a parallel guide an easy displaceability of the blackboard is ensured.

A supporting construction for a drawing board is already known, comprising of a stationary frame, one or more tension springs attached to the frame, the spring force of which is transmitted by a first flexible transmission member, such as a cable, to a first circumferential part of a composite body which is rotatably secured to the frame and on which the extreme end of the first transmission member can be wound or from which it can be unwound, during winding going from a point with the greatest distance from the axis to the point with the smallest distance from the axis, whereas in balance with the said spring force equal and constant forces are taken off from mutually equal circle shaped second and third circumferential parts of the composite body by second and third flexible transmission members respectively, the extreme ends of which are wound on these second and third circumferential parts respectively, which forces are transmitted to the left and right hand side of the blackboard as upwardly directed supporting forces.

The springs in this supporting construction serve for replacing a counterweight which was hitherto used in such constructions, such as known for instance for a sliding window. Springs, used instead of the counterweight, make the supporting construction considerably lighter. The difficulty that the spring force increases during tensioning, could be met by using composite balancing springs, as is known for sliding window springs. Such balancing springs, though very appropriate for a sliding window, however, still give too much friction for a blackboard, so that the user, for instance a child, would soon get tired when repeatedly shifting the board up and down.

In the supporting construction referred to above the difficulty caused by the variable spring force was solved by that the first transmission member, which transmits the spring force to the rotatable composite body, was wound on a non-circular, spiral-shaped curcumferential part of this body going from the circumferential point at the greatest distance from the axis to the circumferential point at the smallest distance from the axis, as was explained above. When the blackboard is shifted down, during which the composite body turns and the springs are stressed, the spring force increases but the distance of the working point to the axis decreases by a spiral way, in such a manner that the rotating couple exercised on the composite body by the force of a spring remains constant and just compensates the rotating couple exercised by the weight of the blackboard.

A spiral-shaped curve-disc, however, is less suitable in practice and besides it is expensive: the invention aims at avoiding the use of non-circular curve-discs in the supporting construction by the provision of an improved and cheaper construction.

According to the invention the supporting construction is made in such a manner that the above mentioned first, second and third circumferential parts of the rotatable body are eccentric half-circular discs, mutually connected in such relative position that, when the first transmission member is wound on the first eccentric half circle, going from the point with the greatest distance from the axis to the point with the smallest distance from the axis, the second and third transmission members are unwound from their eccentric half circles going from the point with the smallest distance from the axis to the point with the greatest distance from the axis.

Preferably the three eccentric half-circular discs have the same radius and the same eccentricity. In this construction the first and second half-circular discs may be united to an eccentric full circular disc.

The invention will now be further elucidated with reference to the following description of an example of performance of the invention, having reference to the drawing. In this drawing:

FIG. 1 shows a supporting construction according to the invention, in rear view, with the proper blackboard, and The FIGURES 2 and 3 show the supporting construction of FIG. 1 in side elevation and bottom elevation respectively.

In the drawing 1 indicates the blackboard which is supported by a supporting construction according to the invention. The supporting construction comprises a frame 2 which can be secured in a stationary manner to a wall or to a trestle which may be displaceable.

In one of the vertical beams 2a, 2b of the stationary frame, at the left in FIG. 1, two strainbolts 3 are arranged at some distance from one another. Each of the strainbolts 3 engages a plug 3a with internal screw thread, which plugs are each gripped firmly in the extreme ends of two tension springs 4. The said extreme ends of both springs 4 are thus adjustably connected to the frame. The other extreme ends of the springs 4 join in the spring holder 5 to which they are each connected by means of a plug 5a and a bolt 5b. The spring holder 5 is provided with a perforated lip 5c for the connection with the chain 13 which further transmits the force set up by the stretching of the tension springs 4 in each position of the spring holder 5, as will be further described later.

On the horizontal underbeam 2d of the stationary frame 2, furthermore, at the left a chain wheel 6 is mounted, the axis 6a of which being journalled in an angle member 6c welded to the side beam 2a of the frame 2. The plane of the wheel 6 is parallel to the plane of the blackboard 1.

Furthermore a number of guide wheels 8 is mounted on each side beam 2a, 2b of the stationary frame 2, running in guide rails 7; the said guide rails 7 are attached by means of angle bars 7a, 7b to the rear side along the vertical side edges of the blackboard 1. The guide rails 7 and the guide wheels 8 together form a guiding construction for the blackboard which can be shifted up and down.

At the left and right extreme ends of the under edge of the blackboard 1 angle members 10 and 11 are secured, to which a grip list 12 is attached, running along the bottom side of the blackboard and projecting somewhat to the front thereof, so that it is easily accessible in any position of the blackboard for a person standing at the front or beside the blackboard.

For compensating the weight of the blackboard 1 in every position on the whole range of the displaceability thereof, so that the blackboard is always hung in a balanced manner, and at the same time for ensuring a perfect parallel guide during the displacements of the blackboard, the supporting construction according to the invention is provided with chains 13, 14 and 15, and with a composite chain wheel 16, 16a.

The chain 13 runs from the spring holder 5 to the upperside of the full circular disc 16 which forms a part of the composite chain wheel 16, 16a. The extreme end of the chain 13 is connected to this full disc at 16b, that is to say in the highest point of this disc in the position of the composite chain wheel 16 corresponding to the highest position of the blackboard 1. During shifting down of the blackboard the composite chain wheel 16 makes a rotating movement starting from this extreme position in clockwise direction, during which the chain 13 is gradually wound on the said full disc as may appear from the intermediate position shown in the drawing.

During the movement to the right of the chain 13 and the spring holder 5 the springs 4 are stretched, so that the spring tension increases.

Around the full disc of the composite chain wheel 16, 16a there lies also a second chain 14, which starts at the extreme end point of the chain 13 and is attached to the full disc at this starting point. In the position of the supporting construction shown in FIG. 1 this starting point of the chain 14 lies near or at the point lying extremely at the right of the full disc of the composite chain wheel 16, 16a. The chain 14 runs by the circumference of the full disc to the lowest point of this disc and then in approximately horizontal direction to the left and further over the earlier mentioned chain wheel 6 mounted on the frame 2 downwards, where it is attached to the above mentioned angle member 10. In this way the left-hand side of the blackboard 1 is supported by the stationary frame 2 by the angle member 10 secured to it, the vertical part of the chain 14 and the chain wheel 6.

The chain 15, already mentioned, serves for supporting the right-hand side of the blackboard 1. One extreme end of this chain lies at and is secured to corner 16c of the circumference of the half-circular disc 16a, which corner is the extreme left-hand point of the half-circular disc in the highest position of the blackboard 1.

The chain 15 lies around the half-circular disc and runs from this disc almost vertically downwards to the angle member 11, secured at the right-hand side at the bottom of the blackboard 1, to which angle member the other extreme end of this chain is secured.

The above mentioned half and full circular discs form together a rigid unit by that they are placed against one another and secured together with their facing sides and they are mounted on a same spindle 17 which is journalled in a vertical beam 2e of the stationary frame 2.

The plane of the composite disc is parallel to the plane of the blackboard 1. As appears from the drawing the half-circular disc does not coincide with the upper part of the full circular disc, though both discs have the same diameter. The deviation is caused by that both discs have an eccentric spindle bore. For both discs the eccentricity is chosen equally large, but the two eccentrically drilled discs are mounted in different positions on the common spindle. In the position shown in FIG. 1 the eccentricity of the full disc, that is to say the situation of the center of the circle with respect of the axis of the spindle, lies in the direction of the point 16b, so that the point with the greatest radius of the full circular disc is at the same time the highest point in the highest position of the blackboard. The half-circular disc is drilled in such a manner that when the straight side lies horizontal the eccentricity lies in horizontal direction at the left from the spindle and the point of this disc lying most at the left is at the same time the circumferential point lying most remote from the spindle. It is remarked that the half-circular disc belonging to the composite chain wheel 16, 16a is exactly equal to the right half of the full circular disc also belonging to the composite chain wheel 16, that is to say that if the half circular disc would be turned 90° in clockwise direction from the position shown in the drawing, the two circular circumferential parts of the two discs would register.

The supporting construction according to the invention works as follows: When the blackboard is shifted down from the highest position, the chains 14 and 15 are unwound from the half and full discs respectively of the composite chain wheel 16, 16a. The chain 14 runs in practically horizontal direction to the left from the chain wheel and the chain 15 in practically vertical direction downwards.

Because of the above described similarity of the half-circular disc and the effective half of the full circular disc, and because of the fact already mentioned, that the two discs can only rotate together, therefore by the same angle, the chains 14 and 15 will be unwound from the chain wheel 16, 16a during rotation thereof with exactly the same velocity, so that a perfect parallel guide of the blackboard 1 remains always ensured. During this movement, therefore, the composite chain wheel 16, 16a rotates to the right, in clockwise direction, so that during this operation the chain 13 will be wound on that half of the full circular disc which lies at the left of the spindle 17 in the position shown in FIG. 1.

By that the chain 13, and with it the spring holder 5, will move to the right during this operation, the two springs 4 are stretched and the spring tension increases. The pulling force of the springs is transmitted to the full circular disc of the chain wheel 16 by the chain 13 and as the chain 13 nearly always lies straight, this force, which is directed to the left, always applies nearly at the highest point of the full circular disc. As a consequence of the eccentricity the distance of the highest point of the full circular disc to the spindle thereof, that is the arm of the couple working to the left, opposite to the clockwise direction of rotation, that is exercised by the force acting on the composite chain wheel 16, 16a, gradually decreases during the downward movement of the blackboard 1. The load is formed by the weight of the blackboard 1 and this is constant. Each of the chains 14 and 15 transmits one half of the load to the composite chain wheel 16, 16a, so that a load couple acts on this latter which works in clockwise direction. As a consequence of the already discussed similarity relation between the composing discs, the arms by which the two halves of the load are effective for creating a clockwise couple, are exactly mutually equal in every position of the chain wheel 16, 16a. The length of the arm of the couple, however, is not constant during rotation of the chain wheel 16, 16a but increases gradually as a consequence of the eccentricity during shifting down of the blackboard 1. The couple of the load thus increases with it.

In the undermost position of the blackboard 1 the springs 4 are fully stretched and the pulling force thereof applies at a point of the circumference of the full circular disc which lies nearest to the point of rotation. The weight of the blackboard 1 applies at the point which is most remote from the point of rotation.

By the choice of the eccentricity in connection with the increase of the stress of the springs in this manner a good balancing is possible. The eccentricity however has as a consequence, that the springs are not fully regularly elongated if the blackboard is regularly shifted down but are more elongated during the movement to the middle position of the blackboard, and thereafter less again than the average elongation. This is caused by that at the highest position of FIG. 1 for instance, when the blackboard 1 comes into the downward movement, the chains 14 and 15 are unwound from the composite chain wheel 16, 16a with the shortest radius, whereas the chain 13 is wound up with the longest radius, so that the springs are extended more than the average amount.

With equal pulling forces of the springs transmitted to the blackboard by the discs in the highest and lowest position of the blackboard, this spring force on the blackboard is therefore always a little greater in the middle position. This difference, however, is mainly compensated by that in the middle position the point of gravity of the composite chain wheel 16 comes at the right of the spindle 17 and thus co-operate to the couple exercised on the composite chain wheel 16 by the weight of the blackboard 1, just like the masses of the unwinding lengths of the chains 14 and 15 co-operate to this couple, whereas the mass of the wound parts of the chain 13 also moves from the left to the right with respect of the spindle 17 and thus gives a result in the same direction. As a result of these different actions the diagram of the forces acting on the blackboard is practically plane, to which it can be remarked that this requirement has only to be fulfilled within practical limits, that is to say within the limits created by the friction in the mechanism, and though the construction has to work easily, it is absolutely undesirable that the friction becomes too low because the blackboard 1 then would already move at the slightest touch, for instance during writing with chalk or cleaning with a towel. However, it is favourable if the couple of the spring force is always, or in parts of the diagram, somewhat greater than the couple of the load. This can be made useful by choosing the spring force in such a manner that in the highest position, even if the frictional resistance during shifting up and down is very low, the blackboard can be loaded without presenting difficulties with a map or the like, whereas otherwise for this purpose a decidedly somewhat stiffly running blackboard would be necessary.

Having now partciularly described and ascertained the nature of my said invention and in what manner the same is to be performed I declare that what I claim is:

1. A supporting construction for balancing a blackboard or like article which can be shifted up and down, comprising a stationary frame, tension springs connected at one end of said frame, said springs connected at their other ends to one end of a first flexible transmission member, said first flexible transmission member secured at its other end to a first circumferential part of a composite body rotatably secured to the frame and on which the last-named end of the first transmission member can be wound or from which it can be unwound in response to movement of the blackboard, said composite body further including mutually equal arcuate second and third circumferential parts, second and third flexible transmission members having one of the ends of each secured to said second and third circumferential parts respectively, the other ends of each of said second and third flexible transmission members secured to the blackboard, said first, second and third circumferential parts of the rotatable composite body being eccentric half circular discs, means connecting said eccentric discs relative to each other for unwinding the second and third flexible transmission members from their eccentric half circles from the point with the smallest distance from the axis to the point with the greatest distance from the axis as the first flexible transmission member is wound on the first eccentric half circle from the point with the greatest distance from the axis to the point with the smallest distance from the axis.

2. A supporting construction according to claim 1, characterized in that the first, second and third eccentric half circular discs all have the same radius and the same eccentricity.

3. A supporting construction according to claim 2, characterized in that the first and second half-circular discs are united to define a circular disc.

References Cited in the file of this patent

UNITED STATES PATENTS

| | | |
|---|---|---|
| 2,178,122 | Ostler et al. | Oct. 31, 1939 |
| 2,274,937 | Raulerson | Mar. 3, 1942 |
| 2,924,411 | Rouverol | Feb. 9, 1960 |
| 3,037,301 | Seipel | June 5, 1962 |